United States Patent [19]

Yoshikawa

[11] Patent Number: 5,177,723
[45] Date of Patent: Jan. 5, 1993

[54] PICKUP MOVEMENT DEVICE FOR DETECTING SPEED USING PICKUP DRIVING COIL

[75] Inventor: Shouji Yoshikawa, Hachioji, Japan

[73] Assignee: Olympus Optical Co., Ltd., Tokyo, Japan

[21] Appl. No.: 460,684

[22] Filed: Jan. 4, 1990

[30] Foreign Application Priority Data

Dec. 1, 1989 [JP] Japan .................................. 1-7468

[51] Int. Cl.[5] ..................... G11G 21/10; G11G 21/02; G11G 7/00
[52] U.S. Cl. ..................................... 369/43; 369/266; 369/32; 360/75; 360/78.05
[58] Field of Search .................... 369/244, 266, 32, 43, 369/48; 360/75, 73.01, 73.04, 73.09, 78.05, 78.06, 78.03

[56] References Cited

U.S. PATENT DOCUMENTS

| 4,408,311 | 10/1983 | Suzuki et al. | 369/43 |
| 4,574,369 | 3/1986 | Koide et al. | 369/44 |
| 4,658,390 | 4/1987 | Fujii et al. | 369/45 |
| 4,745,587 | 5/1988 | Maeda et al. | 369/32 |
| 4,782,476 | 11/1988 | Sekimoto et al. | 369/45 |
| 4,858,214 | 8/1989 | Baba | 369/32 |
| 4,989,190 | 1/1991 | Kuroe et al. | 369/32 |

FOREIGN PATENT DOCUMENTS

| 51-99006 | 9/1976 | Japan . |
| 58-9510 | 2/1983 | Japan . |
| 58-91536 | 5/1983 | Japan . |
| 137168 | 8/1983 | Japan . |
| 1-112576 | 5/1989 | Japan . |

Primary Examiner—Roy N. Envall, Jr.
Assistant Examiner—Jennifer L. Hazard
Attorney, Agent, or Firm—Armstrong, Westerman, Hattori, McLeland & Naughton

[57] ABSTRACT

A pickup movement device includes a plurality of electromagnetic driving coils for moving a pickup. It supplies a driving signal to these plurality of electromagnetic driving coils for the purpose of accessing a target track. The movement speed of the pickup can be detected by a track error signal during access. This track error signal is monitored at access time to see whether the pickup device is within an allowable range. When it is out of the allowable range, a speed signal is detected by one of the plurality of electromagnetic driving coils, which is used to prevent a runaway of the pickup.

16 Claims, 9 Drawing Sheets

FIG. 7
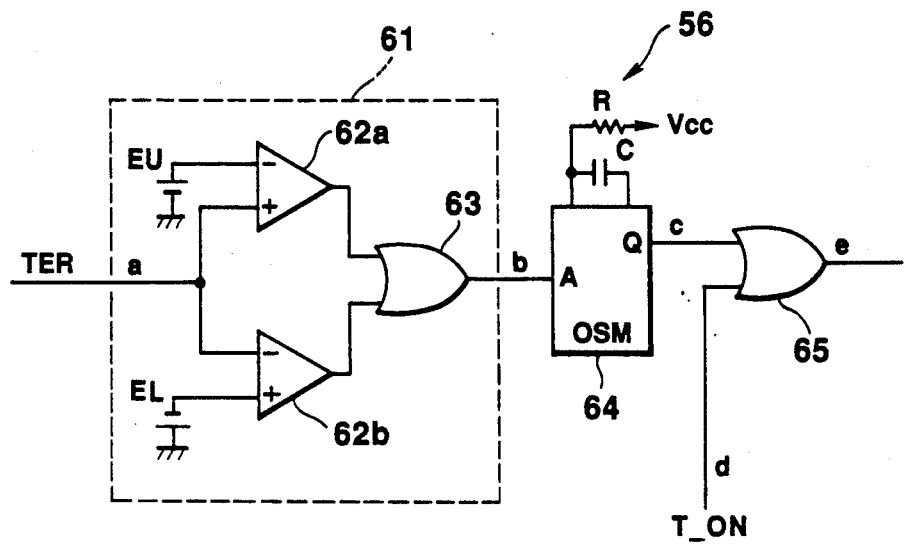
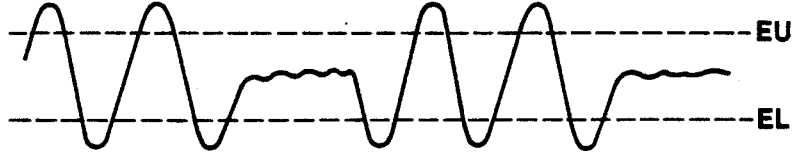
FIG. 8a
FIG. 8b
FIG. 8c
FIG. 8d
FIG. 8e

FIG. 9 a T_ON 
FIG. 9 b ABN 
FIG. 9 c CHANGING SIG. 
FIG. 9 d SW1,2,3 
FIG. 9 e Vprot 
FIG. 9 f OUT PUT OF SUBTR. 53 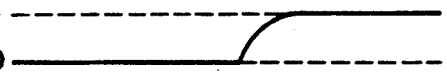
FIG. 12
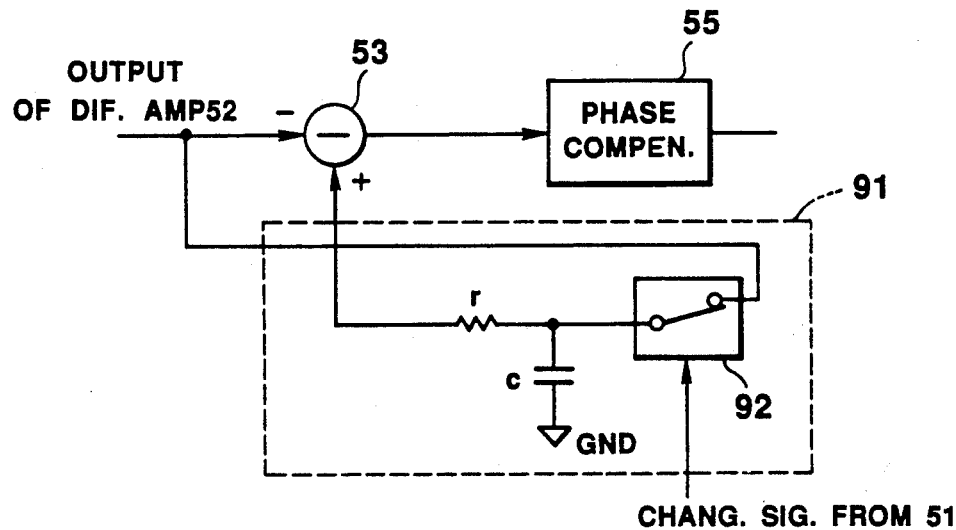

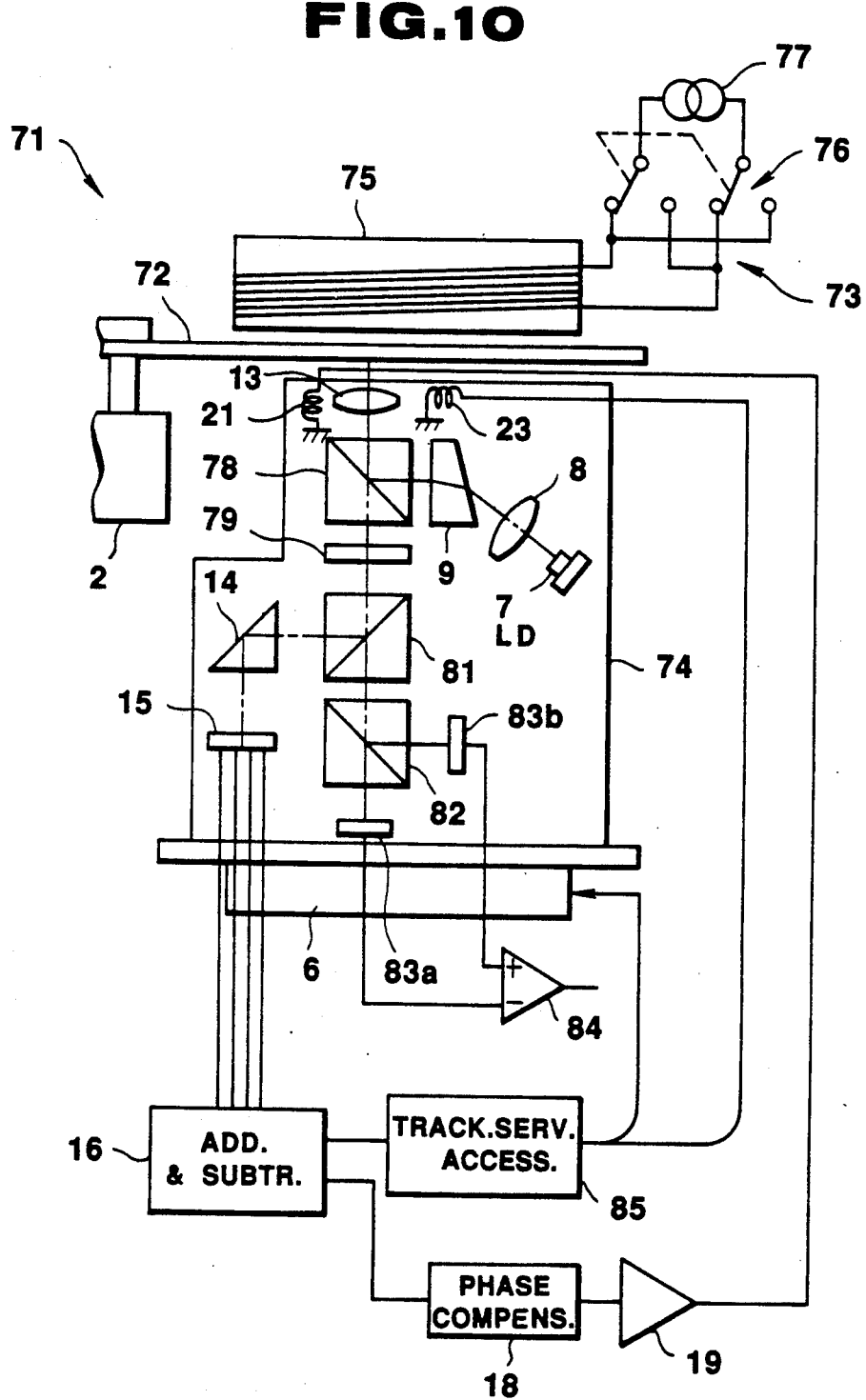

FIG. 13a T_ON 
FIG. 13b ABN 
FIG. 13c CHANG. SIG. 
FIG. 13d Vprot 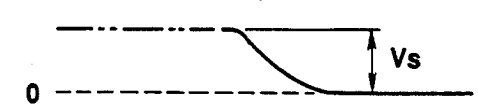
FIG. 13e OUTPUT OF SUBTR. 53 
FIG. 14
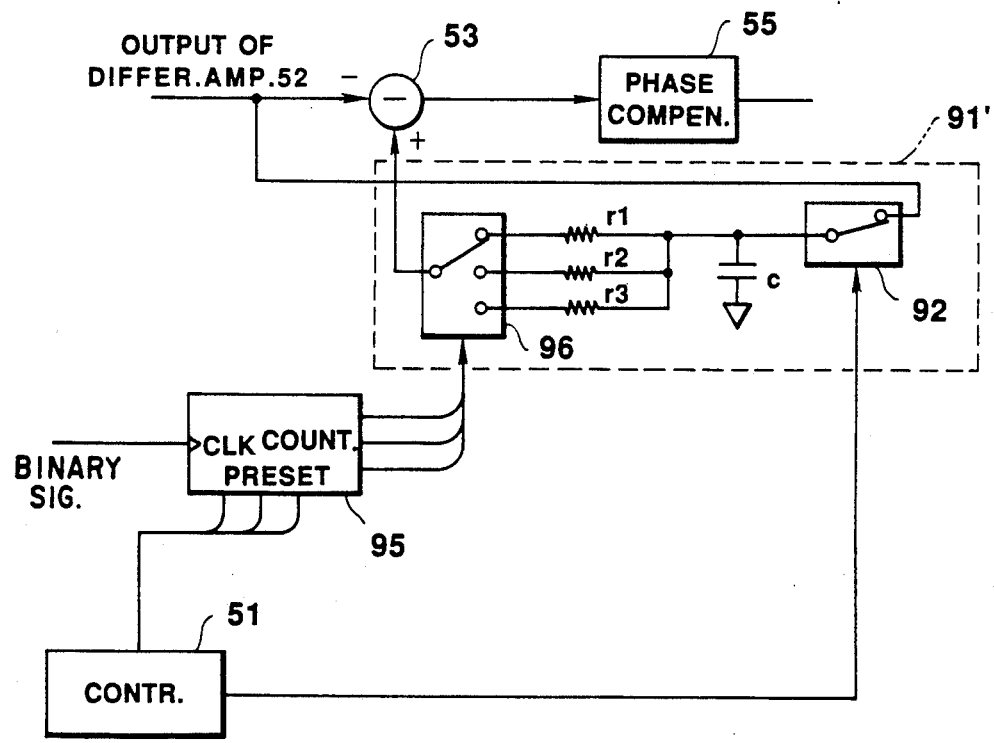

PICKUP MOVEMENT DEVICE FOR DETECTING SPEED USING PICKUP DRIVING COIL

BACKGROUND OF THE INVENTION

1. Field of the Invention

The present invention relates to a pickup movement device in which one of a plurality of electromagnetic driving coils is adapted to switch for use in the detection of the movement and movement speed of a pickup.

2. Description of the Related Art

In recent years, there has been available an optical record reproducing device (hereinafter referred to as an optical disk device) which is capable of recording information optically on an optical disk by forming a train of pits or the like thereon. The optical disk device is capable of reproducing the recorded information by receiving light reflected from a recorded train of pits, when the optical recording medium (hereinafter referred to as an optical disk) is irradiated with light beams condensed by an optical pickup.

In the prior art where a light beam is moved to a target track with respect to the above-mentioned optical disk, a method has been adopted such that an external scale is used in a linear motor and an optical pickup is moved to the vicinity of the target track by using the information obtained from this external scale, after which tracking is carried out to confirm a moved track address and then tracking jumps to the target track.

In recent years, as disclosed in Japanese Patent Publication No. 58-91536, a means (referred to as direct access means) which directly moves to a target track by counting track error signals without using an external scale has been used, aiding in reductions in access time and in cost.

The above-mentioned direct access means has the following problems.

When a vibration is applied to the optical pickup, the movement speed cannot be distinguished, thereby causing a runaway.

That is, when an optical disk is driven to rotate, generally, an eccentricity cannot be avoided.

If the track movement speed (track crossing speed) is made higher so as to render the influence of the speed of eccentricity (the component of the speed in a track crosswise direction) small, the influence of the eccentricity can be avoided. However, when the track movement speed (with respect to the optical disk) becomes relatively small due to a variation, a controller controls so as to make the track movement speed higher, possibly causing a runaway. If the controller is placed in a defocus state because of the variation and a track error signal cannot be detected, the controller controls so as to make the movement speed higher, and runaway may possibly occur.

The track movement speed becomes relatively lower due to the variation and at that time a situation can arise in which a light beam crosses a track in a reverse direction because of the eccentricity. In this case, the correct number of track movements cannot be obtained even if the track error signals are counted, and therefore, prompt track access cannot be made.

On the other hand, Japanese Patent Publication No. 51-99006 discloses an optical disk device in which a coil is wound around each of the ends of a tubular member and one of the coils is used in a driving coil, another coil being used for speed detection.

Japanese Utility Model Examined Publication No. 58-9510 (Japanese Utility Model Unexamined Publication No. 54-152916) discloses a linear motor provided with a driving coil in which the same poles of two magnets are connected to each other by yokes and a driving coil is movably wound on one of the yokes, and provided with a movement speed detection coil integrally connected to this driving coil and movably wound on the other yoke.

Further, Japanese Patent Publication No. 1-112576 discloses an optical disk device in which a magnetic shield plate is provided between a driving coil and a speed detection coil.

When a speed detection coil is provided and the speed of a pickup is detected as in the second and fourth publications, a speed detection coil must be provided in addition to a driving coil. Problems arise in that manufacturing cost is increased and the pickup becomes heavy.

SUMMARY OF THE INVENTION

It is an object of the present invention to provide a pickup movement device capable of preventing runaway of a pickup without newly providing a coil for speed detection.

Another object of the present invention is to provide a pickup movement device capable of being used flexibly depending on its purpose.

Still another object of the present invention is to provide a pickup movement device capable of realizing a highly reliable optical disk device.

The present invention is so arranged that a pickup movement means which moves a pickup to a target track by crossing tracks comprises an electromagnetic driving means having a driving coil, and that one of said plurality of driving coils is made switchable as a speed detection coil and is used for speed detection by a switching signal of a switch control means, and runaway can be prevented.

BRIEF DESCRIPTION OF THE DRAWINGS

FIGS. 1 to 9 are related to a first embodiment of the present invention;

FIG. 1 is a block diagram illustrating the configuration of a light beam movement device of the first embodiment;

FIG. 2 is a view illustrating the configuration of an optical disk device;

FIG. 3 is a circuit diagram of an addition and subtraction circuit;

FIG. 4 is a plan view illustrating the configuration of an optical pickup;

FIG. 5 is a cross sectional view along the A—A' line of FIG. 4;

FIG. 6 is a cross sectional view along the B—B' line of FIG. 4;

FIG. 7 is a configurational view of an abnormality detection circuit;

FIGS. 8a-8e are explanatory views of the operation in FIG. 7;

FIGS. 9a-9f are explanatory views of the operation of the first embodiment;

FIG. 10 is a configurational view of an optical magnetic disk device having the second embodiment of the present invention;

FIG. 12 is a circuit diagram of a protective voltage generation circuit in a variation of the second embodiment;

FIGS. 13a–13e are explanatory views of the operation of the variation; and

FIG. 14 is a circuit diagram of another variation of FIG. 12.

DETAILED DESCRIPTION OF THE PREFERRED EMBODIMENTS

Figure 2:
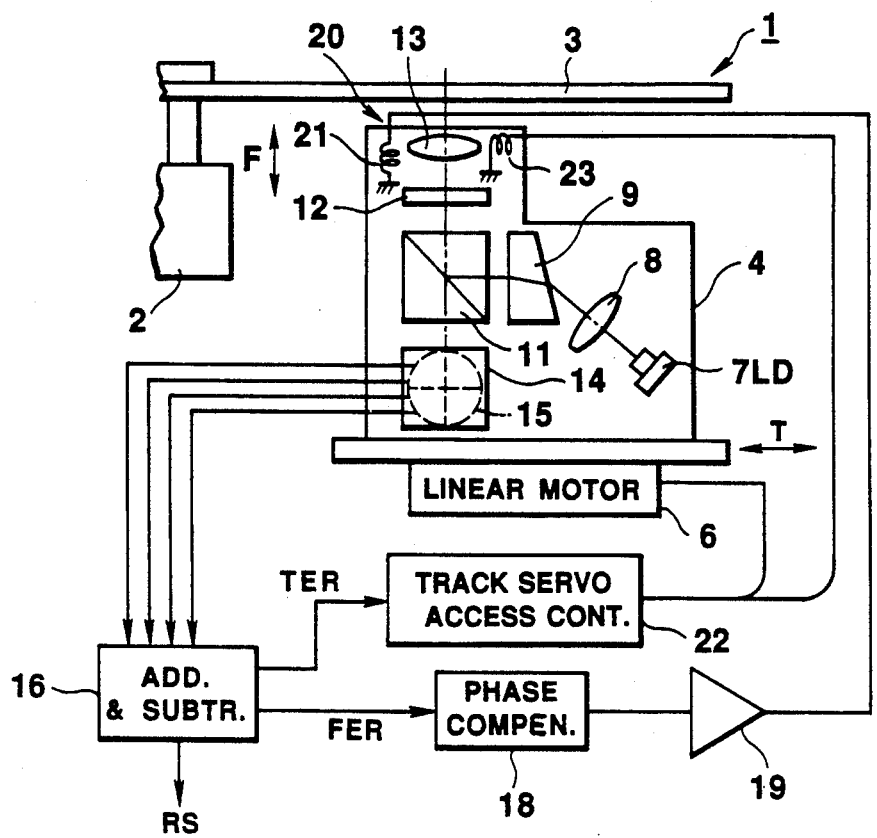

As shown in FIG. 2, an optical disk device 1 having a first embodiment is disposed with an optical pickup 4 oppositely facing an optical disk 3 which is driven to rotate by a spindle motor 2. This (optical) pickup 4 is adapted to move in a radial direction of the optical disk 3, namely, in the direction T in which tracks are crossed by means of a linear motor (or voice coil motor) 6 as a pickup movement means.

The above-mentioned pickup coil 4 houses a laser diode 7 as a generation means of a convergent light beam. The light beam of this laser diode 7 is made a parallel light flux by a collimator lens 8 and shaped to a light beam, the cross section of which is circular, after which it enters a polarized light beam splitter 11, for example, as S polarization. The light beam of the S polarization incident on this polarized beam splitter 11 is reflected substantially 100%. It is made a circularly polarized light beam by a quarter wavelength plate 12, after which it is condensed by an object lens 13 and radiates to the optical disk 3. Light reflected from this optical disk 3 is made a light beam of P polarization after passing through the object lens 13 and the quarter wavelength plate 12. It penetrates the polarization beam splitter 11 substantially 100%. This penetrated light beam is reflected in a direction perpendicular to a paper surface by a critical angle prism 14 and is received by a four-division photodetector 15.

A signal which is photoelectrically converted by the four-division photodetector 15 is input to an adder-subtracter 16. A track error signal TER, a focus error signal FER and a record information regeneration signal RS are generated.

Figure 3:
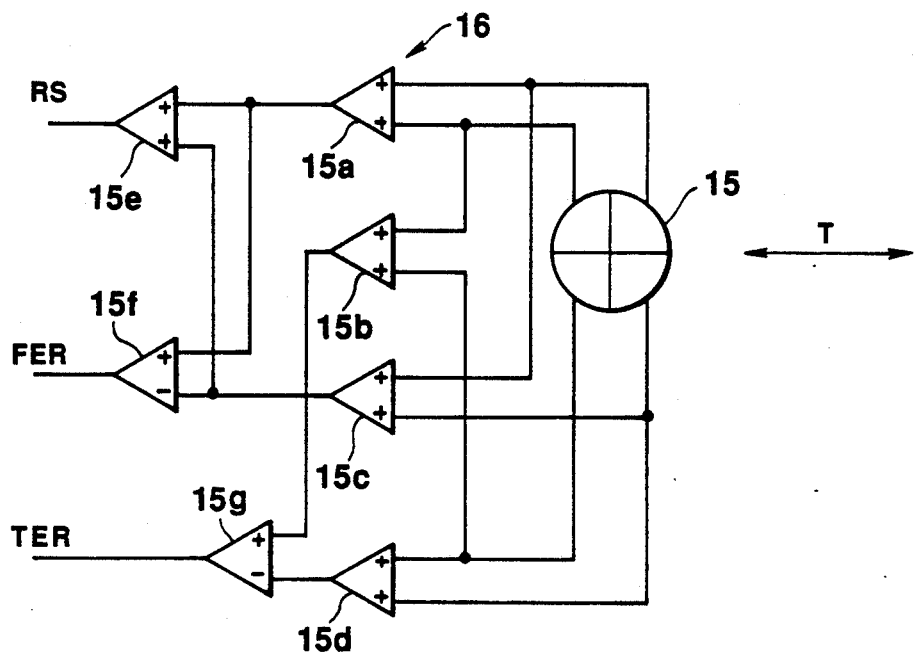

As shown in FIG. 3, the output from each element of the photodetector 15 is respectively added by adders 15a to 15d. The outputs from the adders 15a, 15c are furthermore added by the adder 15e and a regeneration signal RS is generated. The outputs from the adders 15a, 15c are input to a subtracter 15f and a focus error signal FER is generated. The outputs from the adders 15b, 15d are input to a subtracter 15g and a track error signal TER is generated.

The above-mentioned focus error signal FER is applied to a focusing coil 21 constituting a lens actuator 20 after passing through a phase compensating circuit 18 and a driving amplifier 19, causing the object lens 13 to move in a focus direction F (in the direction perpendicular to the plate surface of the optical disk 3) and to keep it in focus.

The above-mentioned track error signal TER is input to a tracking coil 23 and a linear motor 6 after passing through a track servo access control circuit 22, and the control of making a light beam track a track on which light beams are condensed and irradiated at present in the tracking servo state is performed.

In the access mode, a driving signal for crossing tracks is applied to the linear motor, and the control of accessing a target track at a predetermined speed is performed.

Figure 4:
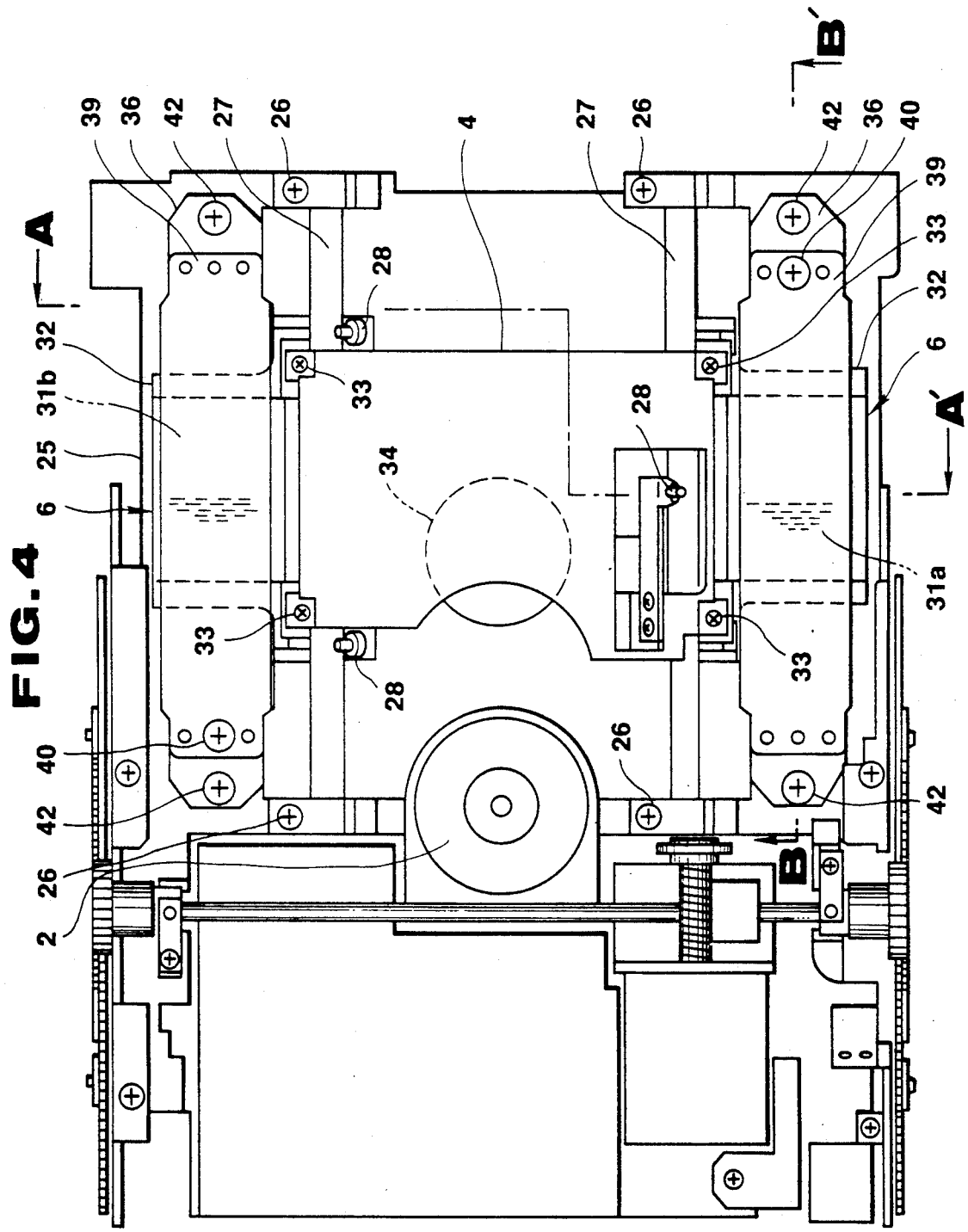
Figure 5:
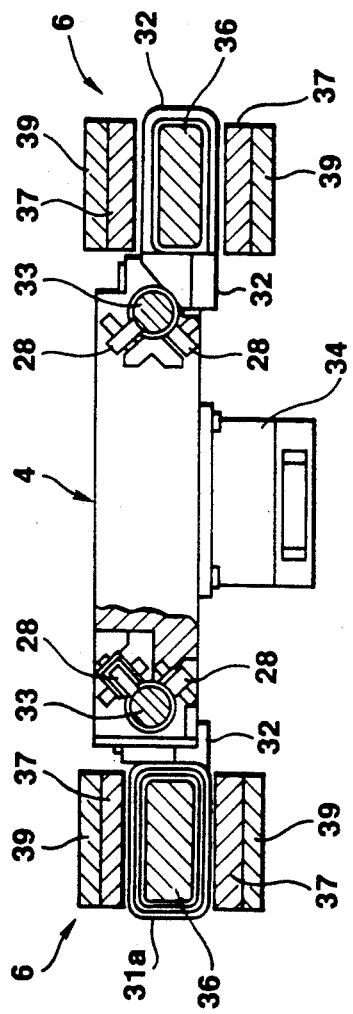
Figure 6:
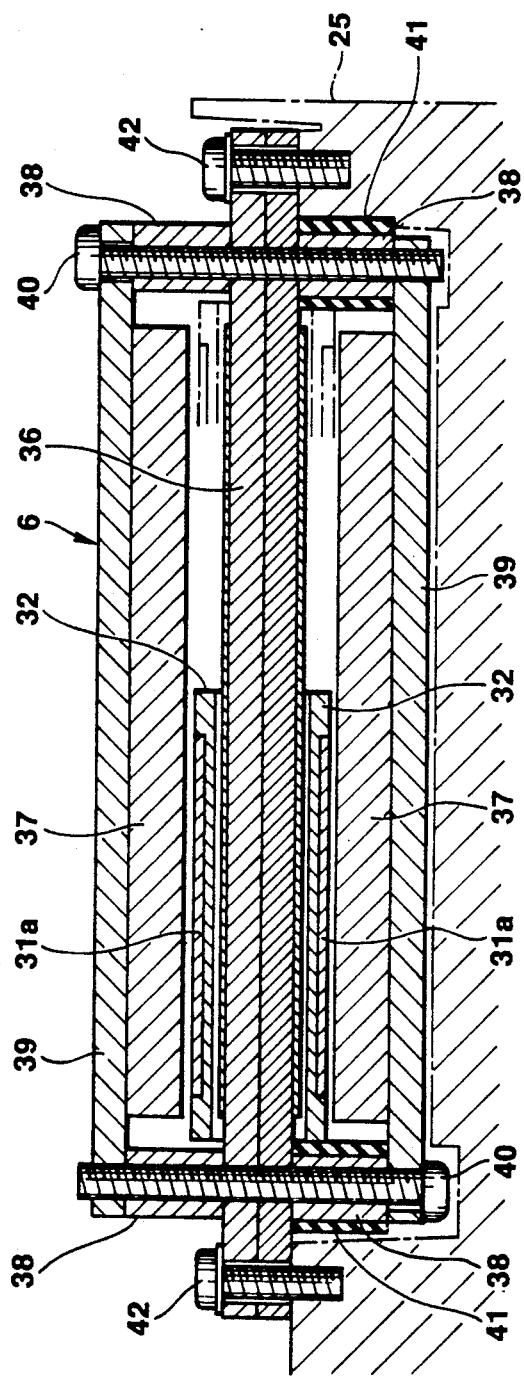

The structure of the linear motor 6 is shown in FIGS. 4 to 6. As shown in FIG. 4, a spindle motor 2 is mounted in the substantially center of a base 25 so that the optical disk 3 can be installed on a driving shaft protruding downwardly. The pickup 4 is disposed on the side of the spindle motor 2. This pickup 4 is movably mounted on guide rails 27, 27 respectively secured by screws 26, 26 at their ends via guide rollers 28, 28, 28. In both sides of the above-mentioned pickup 4, two (electromagnetic driving) coils 31a, 31b are wound around square cylindrical bobbins 32, 32 positioned in parallel. The pickup 4 is screwed to each of the bobbins 32 by means of bolts 33, 33. A lens actuator 34 is housed inside the cylinder of the pickup 4.

As shown in FIGS. 5 and 6, substantially prismatic internal yokes 36 are respectively loosely fitted inside the above-mentioned bobbins 32, both ends of which are made to project beyond the bobbin 32.

In the upper and lower sides of the above-mentioned bobbins 32 are provided permanent magnets 37, 37 oppositely facing each coil 31i ($i=a$ or $b$). The permanent magnets 37, 37 are mounted by bonding or the like on the inside of external yokes 39, 39 which are rigidly mounted on both ends of the internal yoke 36 via spacer members 38, 38, 38, 38.

The height of the above-mentioned spacer members 38, 38, 38, 38 is made to have a small interstitial space between the bobbin 32 and the permanent magnet 37. On both ends of the internal yoke 36, a through hole passing through the internal yoke 36 is provided between the spacer members 38, 38.

The above-mentioned external yokes 39, 39 and internal yokes 36, 36 are respectively secured to each other by means of screws 40, 40.

As shown in FIG. 6, in a case where elastic members 41, 41 are externally fitted to the spacer members 38, 38 and the pickup 4 moves beyond the allowable movement range, even if the end of the bobbin 32 is struck, the impact is softened. One in which the above-mentioned internal yokes 36, 36 and the external yokes 39, 39 are made into one piece can be fixed to the base 25 by fixation holes on both ends of the internal yoke 36 via bolts 42, 42.

The above-mentioned linear motor 6 has two electromagnetic driving coils 31a, 31b and usually performs an access operation by using these two coils 31a, 31b. In this case, the movement speed of the pickup 4 by the linear motor 6 is controlled in such a way that a track crossing speed is detected using a track error signal TER so that it becomes a predetermined crossing speed.

When it is judged that the track error signal TER is not proper as a signal for speed detection, one coil 31b of the above-mentioned coils 31a, 31b is used for speed detection.

Figure 1:
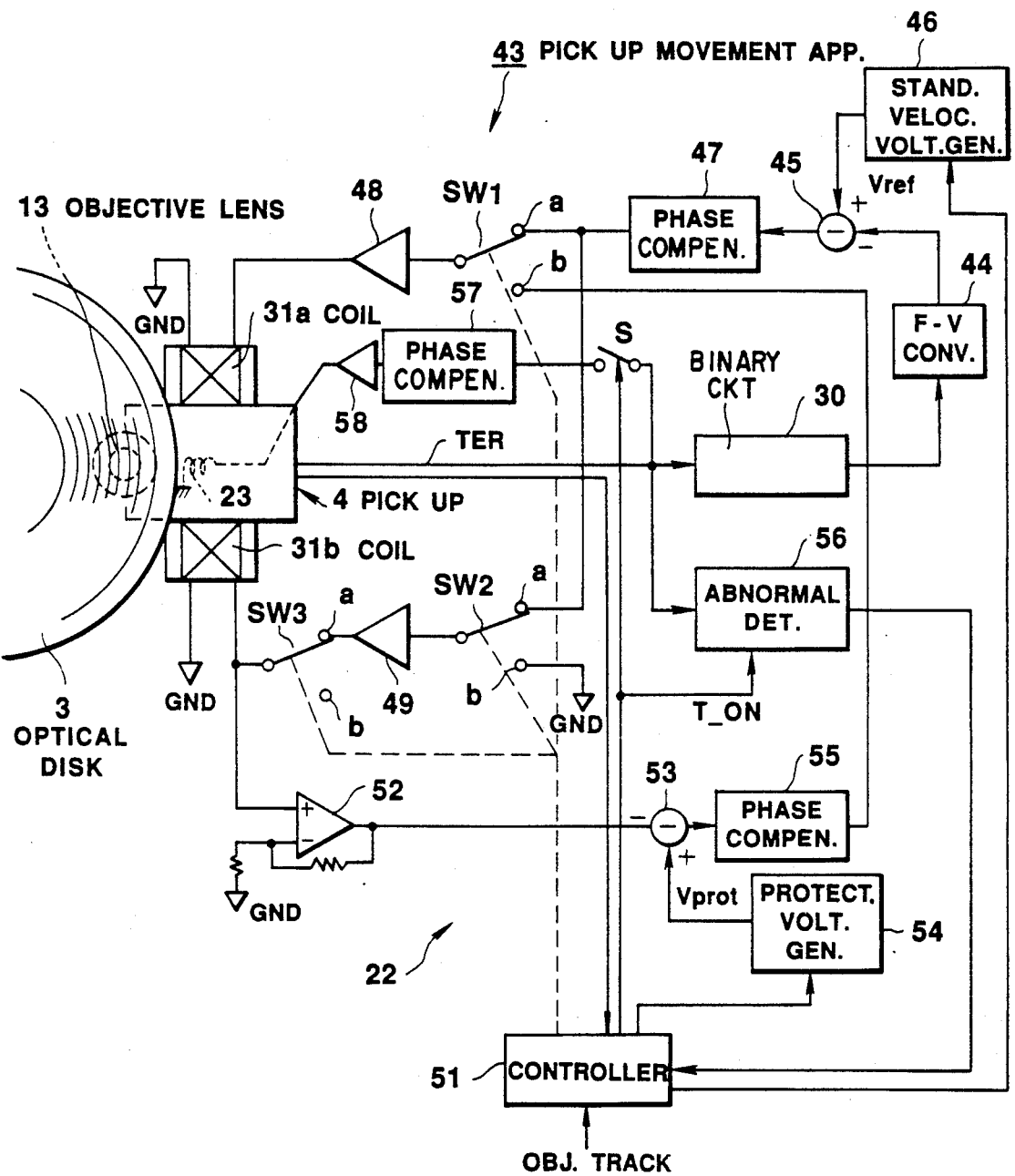

As for these functions, the track servo access control circuit 22 is configured as shown in FIG. 1 and a pickup movement device 43 of the first embodiment is formed.

The track error signal TER output from the pickup 4 (via the addition-subtraction circuit 16) is converted into a binary signal by a two-value conversion circuit 30, after which it is converted into a voltage value corresponding to a track crossing speed via a frequency - voltage (F-V) conversion circuit 44. A voltage signal of this F-V conversion circuit 44, i.e., a speed signal is input to a subtracter 45 and subtracted from a reference speed voltage $V_{ref}$ of a reference speed voltage generation circuit 46. This subtracted voltage, i.e., a speed residual signal is input to a phase compensating circuit 47 and its phase is compensated, after which it is supplied to the coil 31a via a switch SW1 and a driving amplifier 48 and also supplied to the other coil 31b via a driving amplifier 49 and a switch SW3.

The above-mentioned switches SW1, SW2 and SW3 are usually controlled by a controller 51 so as for the contact point a side to become on. In this state, a signal for moving the pickup 4 is supplied to both the coils 31a, 31b by the above-mentioned speed residual signal. Therefore, speed control such that the movement speed of the pickup 4 is kept at the reference speed voltage $V_{ref}$ is performed in this state. The controller 51 compares a target track indicated by an upper-order controller with a track number within a regeneration signal RS by the pickup 4 and outputs an instruction signal to the circuit 46 so that a target speed signal corresponding to the difference between tracks is output to the circuit 46.

On the other hand, the output from the coil 31b is input to the subtracter 53 via a differential amplifier 52 and subtracted from a protective voltage $V_{prot}$ input from a protective voltage generation circuit 54. This subtracted voltage is applied to a contact point b of the first switch SW1 through a phase compensating circuit 55. This protective voltage $V_{prot}$ can be variably controlled by, for example, the controller 51 and is set to 0, for example.

The contact point b of the above-mentioned second switch SW2 is grounded and the contact point b of the third switch SW3 is opened.

The above-mentioned track error signal TER is input to an abnormality detection circuit 56. It is judged whether the track error signal is in a normal state or in an abnormal state and this judgment signal is input to the controller 51.

When the controller 51 which performs the control of the track servo and access judges that the above-mentioned abnormality detection circuit 56 is abnormal, it performs the control of changing the first, second and third switches SW1, SW2 and SW3 from the contact point a to the contact point b.

When the contact point is changed to the contact point b side, the speed voltage detected by the coil 31b is subtracted from the protective voltage $V_{prot}$ and the voltage is phase-compensated, after which it is supplied to the coil 31a via the driving amplifier 48.

Since the above-mentioned protective voltage $V_{prot}$ is, e.g., 0, the values of a resistor R and a capacitor C are set so that a voltage which is made 0, by a sudden deceleration is supplied to the coil 31a, thereby the velocity of the pickup 4 becomes 0 quickly.

During tracking servo control, the controller 51 turns the switch S on and applies a track error signal TER to a tracking coil 23 via the phase compensating circuit 57 and the driving amplifier 58.

The configuration of the above-mentioned abnormality detection circuit 56 is shown in FIG. 7.

A track error signal TER is input to the first and second comparators 62a, 62b constituting the window comparator 61 where the signal is compared respectively with an upper limit voltage EU and a lower limit voltage EL. The output from these comparators 62a, 62b becomes "L" when the track error signal TER is between the voltage EL and the voltage EU, and becomes an "H" output when the signal deviates between the two voltages EL and EU. The outputs of these comparators 62a, 62b are input to an one-shot multivibrator (hereinafter abbreviated as OSM) 64 via the OR circuit 63. The OSM 64 outputs a pulse of a predetermined pulse width T at, for example, a leading edge of a signal input to the input end A. The values of the resistor R and the capacitor C are set so that this pulse width becomes larger than the cycle of the track error signal TER at a normal track crossing speed when a speed voltage detected by the coil 31b is not 0, and the OSM 64 is a retriggerable type. Therefore, the output from this OSM 64 is at an "H" level at all times during ordinary track crossing. The output of the OSM 64 is applied to the abnormality detection signal input end of the controller 51 via an OR circuit 65. A tracking-on signal T_ON from the controller 51 is input to the other end of the OR circuit 65. In a state in which this tracking-on signal T_ON is not being output (this signal is "L"), namely, in an access mode, abnormality detection is carried out.

The binary conversion circuit 30 of FIG. 1 can be configured by the window comparator 61 of FIG. 7.

The operation of the above-mentioned abnormality detection circuit 56 is as shown in FIG. 8.

As shown in FIG. 8d, when track crossing is performed normally in the state of the tracking-on signal T_ON being "L", the track error signal TER becomes a level above the range of the two voltages EL and EU during a normal track crossing as shown in FIG. 8a. In response to thereto, the output from the window comparator 61 becomes as shown in FIG. 8b. However, if a track error signal cannot be output normally due to an external vibration or the like, the output from the window comparator 61 becomes "L" and the OSM 64 outputs an abnormal detection signal ABN of "L" as shown in FIG. 8c. This signal is input to the controller 51, causing the controller 51 to change the switches SW1, SW2 and SW3 to stop the movement of the pickup 4.

On the other hand, when a tracking-on signal T_ON is output, the switch SW of FIG. 1 is turned on and a tracking servo loop for applying the track error signal TER to the tracking coil 23 via the phase compensating circuit 57 and the driving amplifier 58 is formed. When a track is accessed, the level of the the track error signal TER becomes substantially 0.

The operation in a case where an abnormal detection signal ABN is input to the above-mentioned controller 51 is as shown in FIG. 9.

As shown in FIG. 9a, when an abnormal detection signal ABN is detected as shown in FIG. 9b at the time of the tracking-on signal T_ON being "L", the controller 51 outputs a switching signal as shown in FIG. 9c. The switches SW1, SW2 and SW3 are changed by the switching signal so that the contact point b is turned on.

This switching causes the coil 31b to switch from the state in which it is used for driving to the state in which it is used for the movement detection of the pickup 4. A voltage proportional to the movement speed of the pickup 4, i.e., a speed detection voltage, is generated in the coil 31b and this voltage is input to the subtracter 53. In this case, since the protective voltage $V_{prot}$ is set at 0 as shown in FIG. 9e, the output from the subtracter 53 becomes a voltage EO of the polarity opposite to that of a voltage corresponding to the movement speed of the pickup 4 (see FIG. 9f).

Since this voltage EO is supplied to the coil 31a by the phase compensating circuit 55, the switch SW1 and the driving amplifier 48, a driving force in the direction opposite to that of the movement up to that time is supplied. For this reason, the pickup 4 is decelerated and its movement speed becomes 0. That is, as shown in FIG. 9f, it is kept at the protective voltage $V_{prot}$.

The above-mentioned controller 51 outputs a tracking-on signal T_ON (see FIG. 9a) when the above-mentioned abnormal detection signal ABN is no longer detected in order to perform tracking to a track, in the vicinity of it and reads in its tracking number.

After this track number is read in and when the abnormal detection signal ABN is no longer detected, the controller 51 changes the switches SW1, SW2 and SW3 again so as for the contact point a to be turned on in order to move as many tracks as required to move from the current track to the target track and performs the operation of accessing the target track.

According to the first embodiment, in a case where the operation of making a light beam cross tracks and access a target track, when a track error signal TER is monitored and an abnormality occurs in the detected track error signal TER (when it is not regarded as a track error signal during a normal operation state), a speed control system for immediately stopping the optical pickup 4 is formed. Therefore, the runaway of the optical pickup 4, owing to the fact that the track error signal TER is not correctly detected, can be reliably prevented.

In this embodiment, when an abnormality is detected, the pickup 4 is stopped and then it is quickly switched to a tracking state. When an abnormality is detected, tracking is performed to a track near by and its track number is read out. Therefore, if tracking is interrupted because an abnormality is detected, a target track can be accessed quickly after the interruption.

The above-mentioned first embodiment is applied to a case of an overwrite type record reproducing means. Next, an optical magnetic disk device 71 as a photomagnetic record reproducing device serving as an erasable record reproducing means to which a second embodiment is applied will be shown in FIG. 10.

In this optical disk device 71, a photomagnetic disk 72 having a magnetic recording layer in place of the optical device 3 in the optical disk device 1 of FIG. 2 is used, and a magnetic field applying device 73 and a photomagnetic pickup 74 are disposed oppositely facing the photomagnetic disk 72.

The above-mentioned magnetic field applying device 73 comprises an electromagnet 75, a changing switch 76 and a constant current source 88. The direction of a magnetic field applied to the optical magnetic disk 72 is reversed in polarity by the switching of the changing switch 76. Thus, they are set to opposite polarities in the record and erase modes.

On the other hand, in the optical magnetic pickup 74, a beam splitter 78 is used in place of the polarization beam splitter 11 and the quarter wavelength plate 12 is not used in the optical pickup 4 shown in FIG. 2. Further, reflected light which penetrates the beam splitter 78 passes through a quarter wavelength plate 79, after which it is directed to two beam splitters 81, 82.

Light reflected by one of the beam splitters 81 is directed to the critical angle prism 14 (the critical angle prism 14 is placed perpendicularly to a paper surface in practice) and the photo detector 15. Light which penetrates this beam splitter 81 enters the light beam splitter 82 at the next stage. Light penetrated to and reflected by this light beam splitter 82 enters light-receiving elements 83a, 83b respectively. Photoelectric conversion signals from these two light-receiving elements 83a, 83b are input to a subtracter 84 and photomagnetic record information is read out by its differential output.

The output of the above-mentioned photo detector 15 is input to the adder-subtracter 16 and a track error signal TER and a focus error signal FER are generated in the same manner as in the first embodiment.

The above-mentioned track error signal TER is input to the track servo access control circuit 85 constituting the second embodiment.

Figure 11:
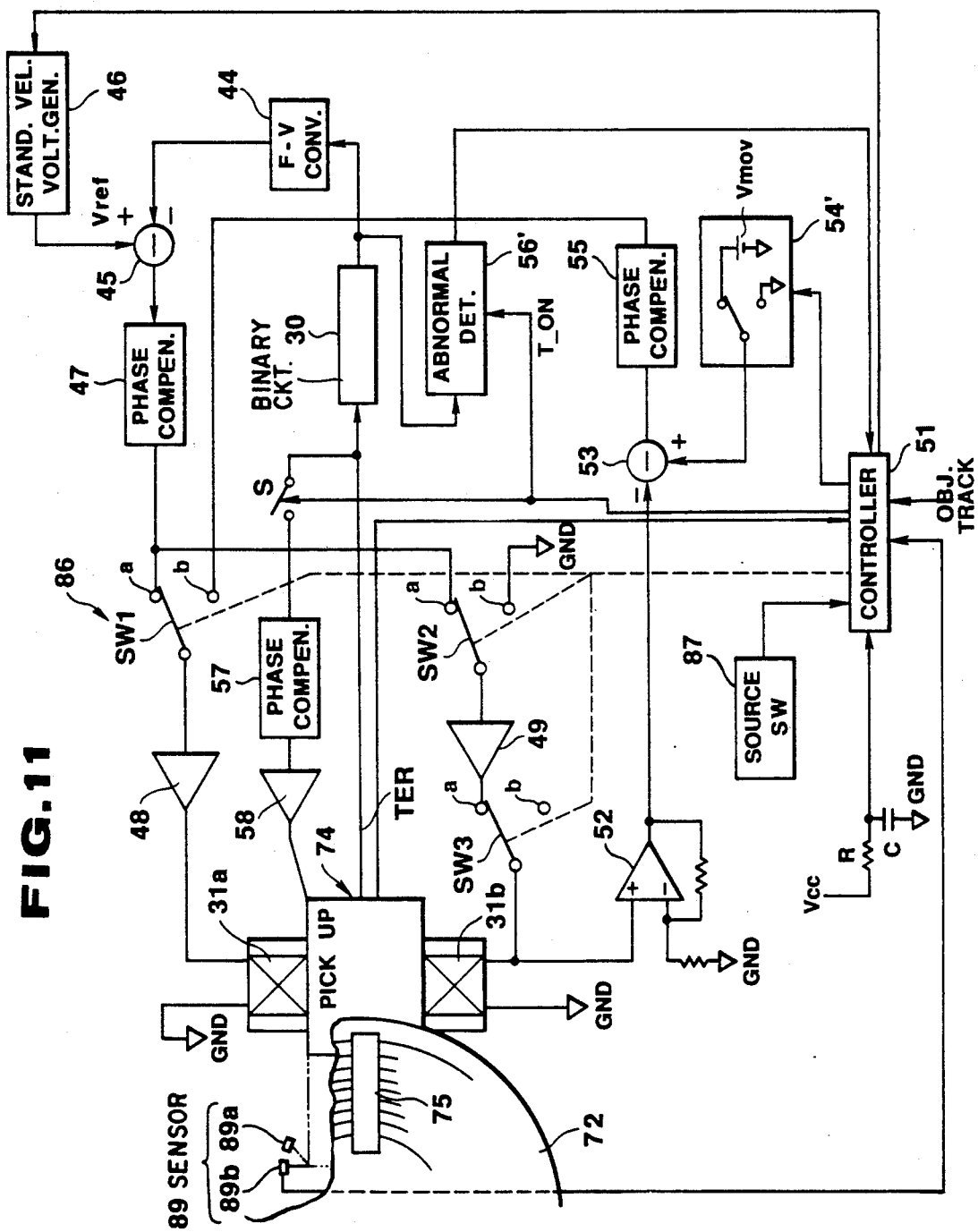
FIG. 11 is a configurational view of a light beam movement device of the second embodiment.

The configuration of a light-beam movement device 86 of the second embodiment using the track servo access control circuit 85 is shown in FIG. 11.

In this second embodiment, the controller 51 of the first embodiment shown in FIG. 1 outputs a voltage for a protective function similar to that of the first embodiment and further outputs a movement voltage $V_{mov}$ to a protective-movement voltage generation circuit 54' provided in place of the protective voltage generation circuit 54.

For example, when a power supply switch 87 is turned on, the controller 51 detects that the voltage of the capacitor C gradually charged via a high resistor R at the leading edge of a power supply voltage $V_{cc}$ is at an "L" level and judges that a device is placed in an operating state. Hence, the switches SW1, SW2 and SW3 are changed so as for the contact point b to become on and a control signal for outputting a movement voltage $V_{mov}$ which is not zero is sent from the protective-movement voltage generation circuit 54'. A certain time later, this control signal is changed and the subtracter 53 is made to output a zero voltage. The light beam is directed to a predetermined position, for example, an initial set position on the inside than the innermost circumference track.

The movement to this initial set position can be performed safely without causing a runaway by movement control based on a speed detection voltage using the coil 31b even if the movement is to the position at which tracks are not formed.

For example, when the optical pickup 74 is moved to a initial set position, this fact is detected by a sensor 89. The sensor 89 comprises, for example, a light-emitting element 89a and a light-receiving element 89b which receives light of the light-emitting element 89a reflected by the pickup 74. An output signal from the light-receiving element 89b is input to a controller 51.

After the light beam is moved to the initial set position, setting of the intensity of the light beam or the like can be performed.

In this embodiment, it is judged whether a binary signal of the binary conversion circuit 30 is abnormal or not by an abnormality detection circuit 56'.

The abnormality detection circuit 56' comprises the OSM 64 and the OR circuit 65, excluding the window comparator 61 in FIG. 7. In other words, it uses the binary conversion circuit 30 for both the front process for an F-V conversion and the front process for detecting an abnormality. As a result of the common use in this way, when the amplitude of a track error signal becomes small due to a vibration or the like, the signal is not converted to a binary value and the F-V conversion cannot be correctly performed. It follows that the signal is detected as an abnormality detection at the abnormality detection circuit 56'. The rest is the same as that of the first embodiment, so the explanation is omitted.

When an abnormality is detected by using a track error signal TER, a light beam may be moved to a predetermined position such as an initial set position or the like.

The above-mentioned second embodiment is applied to the photomagnetic disk device 71, but it can also be applied to an optical disk device.

In the first embodiment shown in FIG. 1, for example, a protective voltage detection circuit 91 for generating a voltage which becomes zero by a proper time constant as a voltage $V_{prot}$ for the protective-movement voltage generation circuit 54 may be used, as shown in FIG. 12.

The output from the differential amplifier 52 causes the capacitor C to be charged via a switch 92. The voltage of this capacitor C is input to the subtracter 53 via a resistor r.

The above-mentioned switch 92 is usually on and is turned off by a switching signal from the controller 51.

That is, as shown in FIG. 13c, when a switching signal is output, the switch 92 is turned off. The terminal voltage $V_s$ of the capacitor C has become a voltage corresponding to the movement speed of the pickup 74 by the output from the differential amplifier 52 just before the switch 92 is turned off.

Therefore, the input resistance value of this voltage $V_s$ becomes large via the resistor r and is applied to the subtracter 53. As shown in FIG. 13d, the voltage $V_s$ drops substantially at the time constant of rc, after which it becomes zero.

In this case, the output from the subtracter 53 varies, as shown in FIG. 13e, for example, although this depends on the time constant of rc or the response speed of the pickup 74. The pickup 74 is braked by the output signal from the subtracter 53 so that its speed becomes zero and the pickup 74 stops. As a result of this, overloading of the coil 31b can be reliably prevented.

The voltage $V_{prot}$ may be varied according to the amount of the track movement or the like. When the pickup 74 is sufficiently far from a target track, for example, the time constant for braking may be made long and the pickup 74 is stopped. When the pickup 74 is very close to a target track, the time constant may be made short and the pickup 74 is stopped.

As shown in FIG. 14, a binary signal of the binary signal conversion circuit 30 is input to a down counter 95. Two times the number of tracks moved (crossed) is preset to the preset terminal of the counter 95 from the controller 51, and it is subtracted by 2 each time one track is crossed. The select operation of the selector 96 of the protective voltage generation circuit 91' is controlled by the output from the counter 95.

For example, when the output value of the counter 95 is large, a resistor (e.g., r3) of a large value is selected, and when the output value becomes small, a resistor (e.g., r1) of a small value is selected.

The protective voltage generation circuit 91' is configured in such a way that a plurality of resistors r are used in the circuit 91 of FIG. 12 and a selector 96 is provided.

Thus, when the pickup is close to a target track, it can be stopped in a time shorter than when it is far from the target track. In a case where a target track is a track close to the outermost circumference or close to the innermost circumference, when an abnormality is detected at a place near the target track, the pickup can also be stopped quickly by a small time constant.

Further, in the present invention, even when a track error signal TER is not particularly detected, a movement speed can be detected. Therefore, in a case where its track number cannot be detected, even when the pickup is stopped without changing the time constant and it is switched to a tracking state, the pickup can also be controlled so as to move to an initial position (home position). When the track number cannot be detected even if the pickup is set in a tracking state, there exists the possibility that the pickup is moved to the outside of the outermost circumference or the inside of the innermost circumference, and therefore in this case, the pickup may be moved in a direction opposite to the movement direction.

Further, in the above-mentioned embodiments, a case where two coils are used for a plurality of coils is explained. However, it is apparent that the present invention can also be applied to a plurality of coils of three or more rather than two. Even in a case of a single coil, when a tap is provided and a portion of the coil is used for driving, and the other portion or all the rest of it is used for speed detection, it becomes equal to the case of a plurality of coils.

In the embodiment shown in FIG. 1, for example, when it is judged that an abnormality is detected, the switch SW1 is changed to the contact point b side and a zero voltage (or a voltage which becomes zero gradually) from the protective movement voltage generation circuit 54 is applied to the coil 31a. A similar voltage is also applied to the coil 31b in a similar manner so that runaway is regulated in any event (in this case, speed detection is not performed). After these operations, a closed loop for stopping the pickup at a voltage corresponding to the speed of the coil 31b may be generated.

As set forth hereinabove, according to the present invention, at least one of a plurality of electromagnetic driving coils used to move a pickup can be changed for use in speed detection. Therefore, even if a track error signal cannot be obtained, speed control for preventing runaway and others can be performed easily.

What is claimed is:

1. A pickup movement device, comprising:
   light beam generating means for generating a convergent light beam;
   an optical pickup having a photo detector for condensing said light beam and irradiating an optical recording medium with said light beam and for receiving light reflected from the optical recording medium;
   first and second electromagnetic driving coils for moving said optical pickup in a direction in which tracks of said optical recording medium are crossed;
   driving signal generation means for supplying a driving signal to said first and second electromagnetic driving coils in order to move said optical pickup;
   abnormality judgment means for determining whether a track error signal deviates from a predetermined allowable range and producing an output signal indicating an abnormality condition;
   control means receiving the output signal of said abnormality judgment means, for controlling the movement of said optical pickup when said abnormality judgment means determines an abnormality condition;
   switching means receiving a signal from said control means for selectively cutting off said driving signal from said first electromagnetic driving coil when said abnormality judgment means determines an abnormality condition; and speed signal detection means for detecting a speed signal corresponding to the movement speed of said optical pickup from said first electromagnetic driving coil to which said driving signal is not supplied when said abnormality judgment means determines an abnormality condition;

wherein, during an abnormality condition, said control means for controlling the movement of said optical pickup supplies a control signal based on said speed signal to said second electromagnetic driving coil.

2. A pickup movement device according to claim 1, wherein said optical pickup includes an object lens for condensing said light beam and radiating said optical recording medium with said light beam, and a lens actuator means for moving the object lens in a direction perpendicular to a plate surface of said optical recording medium and in a direction in which said tracks are crossed.

3. A pickup movement device according to claim 2, including a track error signal generation means for generating the track error signal in response to the output signal from said photo detector.

4. A pickup movement device according to claim 3, including a focus error signal execution means for generating a focus error signal by the output signal from said photo detector.

5. A pickup movement device according to claim 4, including a record information reproducing means for reproducing information recorded on said optical recording medium by the output signal from said photo detector.

6. A pickup movement device according to claim 5, including a bias magnetic field applying means for applying a bias magnetic field to the recording medium, said optical recording medium being a photomagnetic recording medium.

7. A pickup movement device according to claim 5, wherein said driving signal generation means includes a reference speed voltage generation means for generating a reference speed voltage used to make said optical pickup cross said tracks at a predetermined crossing speed.

8. A pickup movement device according to claim 5, including a two-value conversion means for converting said track error signal in a state where said driving signal is supplied to said first and second electromagnetic driving coils into a two-valued signal for shaping a waveform, and a crossing speed signal generation means for generating a track crossing speed signal corresponding to the track crossing speed from the two-valued signal.

9. A pickup movement device according to claim 5, wherein said abnormality judgment means performs a switching operation of said switching means by means of a signal indicating that said abnormality judgment means has judged that said track error signal deviates and supplies said control signal to said second electromagnetic driving coil.

10. A pickup movement device according to claim 6, wherein said abnormality judgment means performs a switching operation of said switching means by means of a signal indicating that said abnormality judgment means has judged that said track error signal deviates and supplied said control signal to said second electromagnetic driving coil.

11. A pickup movement device according to claim 7 or 8, wherein said control means outputs said control signal generated by subtracting said speed signal from a zero voltage.

12. A pickup movement device according to claim 7 or 8, wherein said control means outputs said control signal generated by subtracting said speed signal from a voltage which becomes zero gradually.

13. A pickup movement device according to claim 10, wherein said control means supplies said track error signal to said object lens in a state in which said driving signal is not output when said judgment means judges that said track error signal does not deviate from an allowable range, and sets a tracking mode in which a radiation position of a light beam is controlled to a track at which said track error signal becomes substantially zero.

14. A pickup movement device according to claim 5, wherein said control means performs control when a power supply of this device is turned on such that said switching means is made to perform a switching operation and to supply said driving signal to said second electromagnetic driving coil so that said optical pickup is moved to an initial set position.

15. A pickup movement device according to claim 1 wherein said first and second electromagnetic driving coils are wound on each bobbin mounted on each side of said optical pickup, each yoke disposed on each side of said optical pickup in parallel to said crossing direction, being inserted into each of said yokes, and said coils constituting a linear motor in which magnets which generate a magnetic flux in a direction perpendicular to said crossing direction are disposed on each of the yokes.

16. A pickup movement device according to claim 4, including a track access means for accessing a target track by supplying said driving signal to said first and second electromagnetic driving coils and by detecting the number of crossed tracks from said track error signal.

* * * * *